(12) United States Patent
Turányi et al.

(10) Patent No.: US 6,990,339 B2
(45) Date of Patent: Jan. 24, 2006

(54) MOBILITY MANAGEMENT FOR MOBILE HOSTS

(75) Inventors: Zoltán Turányi, Budapest (HU); András Valkó, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 266 days.

(21) Appl. No.: 10/381,989

(22) PCT Filed: Oct. 2, 2001

(86) PCT No.: PCT/EP01/11384

§ 371 (c)(1),
(2), (4) Date: Apr. 1, 2003

(87) PCT Pub. No.: WO02/32159

PCT Pub. Date: Apr. 18, 2002

(65) Prior Publication Data

US 2003/0228868 A1    Dec. 11, 2003

(30) Foreign Application Priority Data

Oct. 9, 2000   (GB) .................................. 0024677

(51) Int. Cl.
*H04Q 7/20* (2006.01)
*H04Q 7/00* (2006.01)

(52) U.S. Cl. .................... 455/432.1; 455/439; 370/331

(58) Field of Classification Search .. 455/432.1–435.2, 455/439, 466, 558, 436; 370/331, 395.21, 370/310.2, 352, 399
See application file for complete search history.

(56) References Cited

U.S. PATENT DOCUMENTS 5,457,680 A * 10/1995 Kamm et al. ................ 370/332

(Continued)

FOREIGN PATENT DOCUMENTS

EP   1 017 208 A2   7/2000

OTHER PUBLICATIONS

Henning Schulzrinne, et al., "Application-Layer Mobility Using SIP", Mobile Computing and Communications Review, vol. 4, No. 3, pp. 47-57, Jul. 2000, ACM, New York, US.

*Primary Examiner*—Benny Q. Tieu

(57) ABSTRACT

The present invention relates to a system having a mobile host (1) which can attach to different access networks (3A, 3B) for carrying on an active communications session with a correspondent host (2). The mobile host (1) has an identifier (NAI) which is independent of the access network (3A, 3B) to which the mobile host (1) is attached, but is assigned a communication address(IP Address) for carrying on an active communications session with a correspondent host (2), which address changes for example depending on the access network (3A, 3B) to which the mobile host (1) is attached. The system has a database (UNS User Name Service) which registers the association of the mobile host identifier (NAI) and the current communications address (IP address) of the mobile host (1). The correspondent host (2) is informed of the identifier (NAI) of the mobile host (1) when an active communications session is first established between the mobile host (1) and the correspondent host (2), and the correspondent host (2) accesses the database (UNS) to determine the current communications address of the mobile host (1). In accordance with the present invention, the mobile host (1) is engaged in an active communications session: detects when the communications address (IP address) of the mobile host (1) changes, for example as a result of attachment of the mobile host (1) to a different access network (3A, 3B): and upon detection of such a change of the communications address (IP address), sends a message (HANDOVER MESSAGE) to the recorded correspondent host (2), the message containing the mobile host's (1) identifier (NAI). The correspondent host (2) then uses the identifier (NAI) to access the database (UNS) to obtain the changed communications address (IP address) of the mobile host (1). The invention also provides related methods and mobile hosts.

13 Claims, 5 Drawing Sheets

U.S. PATENT DOCUMENTS 5,930,712 A     7/1999  Byrne et al.
6,473,411 B1 *  10/2002 Kumaki et al. ............. 370/331
6,693,886 B1 *  2/2004  Haikonen et al. ........... 370/338

OTHER PUBLICATIONS

Andras Valko, et al., "Cellular IP: A New Approach to Internet Host Mobility", Computer Communication Review, Association for Computer Machinery, vol. 29, No. 1, pp. 50-65, Jan. 1999, New York, US.

* cited by examiner

MOBILITY MANAGEMENT FOR MOBILE HOSTS

TECHNICAL FIELD OF THE INVENTION

The present invention relates to internetwork mobility control for mobile hosts, such as wireless computers, and in particular mechanisms for allowing mobile hosts to maintain active data sessions during handovers between access networks.

TECHNICAL BACKGROUND AND RELATED ART

Wireless mobile access to the Internet is expected to represent an increasingly important segment of the communications industry. Access to the Internet will be offered, for example for wireless connection enabled laptop and palmtop computers, by a variety of wireless access network operators. Wireless access networks typically have a number of wireless base stations and mobile hosts, e.g. wireless enabled mobile computers acting as mobile Internet hosts, can connect to one or more of these base stations at any time and use it or them to relay data to/from a correspondent host or hosts, for example in the wired network. Due to mobility, a mobile host may sometimes need to release its connection to a base station and establish a connection to another base station. If this action happens during an active data session, the network must ensure that there is little disturbance to the ongoing communication between the mobile host and the correspondent host or hosts. The mechanisms that support such a mobility of a mobile host are referred to as handover.

The geographical areas covered by different access networks often overlap, thus allowing for quick migration from one network to another one. A mobile host may sometimes need to perform a handover between base stations that belong to two different networks. The term "inter-network handover" is used herein to refer to a mobile host's moving from one access network to another access network during an active data session. Due to inherent characteristics of the Internet Protocol (IP) a movement of a mobile host between different access networks necessarily involves a change of the mobile host's IP address. However, a change of an Internet host's IP address during an active data session breaks the ongoing session. Special mechanisms are therefore required that allow mobile hosts to move between access networks during active data sessions.

The so-called Mobile IP protocol represents a mechanism that allows a mobile host to maintain an active data session during migration from one access network to another, even though the mobile host needs to change its IP address. In this solution a static anchor point (referred to as Home Agent) is assigned to mobile hosts. Correspondent hosts willing to send packets to a mobile host need to transmit packets to its Home Agent which, in turn, forwards packets to the mobile host's actual location. When the mobile host moves to a new network and is assigned a new IP address, it must inform its Home Agent. In a variant of this protocol, referred to as Mobile IP with Route Optimization, the correspondent hosts or nodes are allowed to send packets directly to the mobile host's actual location thus eliminating need to use Home Agents for the forwarding of each packet. The first (or first few) packets of a data session, however, are still forwarded to the mobile host through its Home Agent. In this variant of the Mobile IP protocol, mobile hosts must also notify correspondent hosts after migrations from one access network to another.

The drawback of the Mobile IP protocol, with or without Route Optimization, is the need for a statically allocated Home Agent. The use of Home Agent ties the operation of a mobile host to its home network even when its actual location is a long distance from its home. Messages exchanged between the mobile host and its Home Agent may travel a long way and consume a significant amount of network resources in addition to suffering delay. The Route Optimization variant of Mobile IP removes the need to forward all packets through the Home Agent but it requires, in exchange, a security association between the mobile host and a correspondent host. In addition, it does not eliminate the need to inform the Home Agent when migration between access networks takes place, since communication sessions still start by forwarding packets through the Home Agent.

Home Agents can be avoided if correspondent hosts send their packets directly to a mobile host's actual IP address at all times. A mechanism that supports this has been proposed which uses a (possibly distributed) database that maps Network Access Identifiers (NAI) of mobile users to IP addresses. Herein, this database will be referred to as User Name Service (UNS). Correspondent hosts willing to communicate with a mobile host can contact this database and obtain the actual IP address of their called party, i.e. the mobile host. Using this mechanism, however, a mobile host cannot maintain its active data session when it moves to a new network and changes its IP address. The mechanism only supports migrations between data sessions.

SUMMARY OF THE INVENTION

Problem Addressed by the Present Invention

The primary problem addressed by the present invention is that of enabling a mobile host to maintain active data sessions during handovers between access networks, without relying on Home Agents.

The present invention provides a system having a mobile host which can attach to different access networks for carrying on an active communications session with a correspondent host. The mobile host has an identifier which is independent of the access network to which the mobile host is attached, but is assigned a communications address for carrying on an active communications session with a correspondent host, which address changes for example depending on the access network to which the mobile host is attached. The system has a database which registers the association of the mobile host identifier and the current communications address of the mobile host. The correspondent host is informed of the identifier of the mobile host when an active communications session is first established between the mobile host and the correspondent host, and the correspondent host accesses the database to determine the current communications address of the mobile host. In accordance with the invention, the mobile host comprises a control unit which maintains a record of the correspondent host with which the mobile host is engaged in an active communications session, detects when the communications address of the mobile host changes, for example as a result of attachment of the mobile host to a different access network, and upon detection of such a change of the communications address, sends a message to the recorded correspondent host, the message containing the mobile host's identifier.

The correspondent host then uses the identifier to access the database to obtain the changed communications address of the mobile host.

In addition to the system set out above, the present invention also provides related methods and mobile hosts.

The present invention provides that mobile hosts can maintain active data sessions during inter-network handovers without the use of Home Agents, and without the use of similar agents, such as foreign agents or roaming agents. Further, embodiments of the present invention can be implemented such that mobile hosts are not required to maintain security associations with their correspondent hosts.

It will be understood that although the present invention is primarily concerned with maintaining active data sessions during inter-network handovers, embodiments of the invention can be used to maintain active data sessions in other circumstances in which the address (IP address) of a mobile host changes.

DETAILED DESCRIPTION OF PREFERRED EMBODIMENTS

Before proceeding to description of preferred embodiments of the present invention, aspects of prior art systems will first be described with reference to FIGS. 1 to 3.

Figure 1:
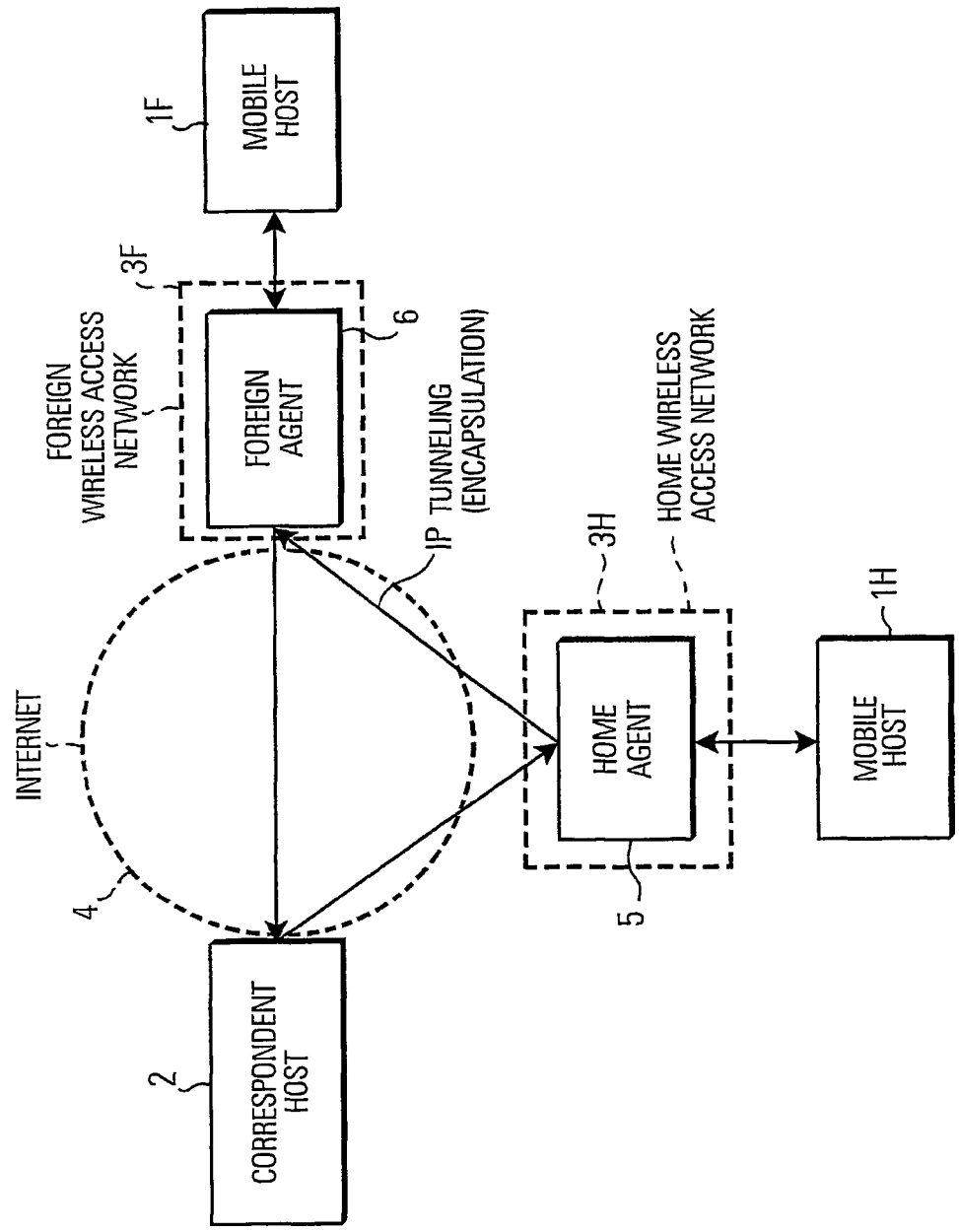
FIG. 1 schematically illustrates a prior art system using Mobile IP protocol and a Home Agent.

FIG. 1 illustrates a prior art system which uses Mobile IP protocol and a Home Agent for communications between a mobile host and a correspondent host via a wireless access network, and the Internet.

When a mobile host 1H is communicating with a correspondent host 2 via its home wireless access network 3H, and the Internet 4, the IP address of the mobile host 1H is a fixed home address which points to the home network 3H. With the mobile host 1H on its home network it can operate as though it had a fixed connection with the Internet, without need for any special mobile IP considerations. Thus, communications or data packets can pass to and from the correspondent host 2 and mobile host 1H directly. The functionality of the Home Agent 5, shown in FIG. 1, associated with the home wireless access network is not needed for handling this direct communication, although FIG. 1 shows that communications pass through the Home Agent 5.

However, when a mobile host 1F is communicating with correspondent host 2 by way of a foreign wireless access network 3F, and the Internet 4, packets from the correspondent host 2 are still sent to the home address, pointing to the home network 3H, of the mobile host 1F. In one variant of mobile IP (referred to as basic mobile IP) to enable communications or packets to pass from the correspondent host 2 to the mobile host 1F, on the foreign wireless access network 3F, the Home Agent 5 associated with the home network 3H and a foreign agent 6 associated with the foreign mobile access network 3F are provided.

When the mobile host 1F attaches to the foreign access network 3F, the foreign agent 6 offers an IP address to the mobile host 1F for use in a data session. This address offered by the foreign agent 6 is a so-called care-of address which differs from the home address of the mobile host 1F, to which home address packets from the correspondent host 2 destined for the mobile host 1F are all sent. The mobile host 1F sends registration messages to the foreign agent 6, which in turn forwards them to the Home Agent 5, which messages identify the care-of address now used by the mobile host 1F. In response, the home agent registers the care-of address in association with the home address of the mobile host 1F.

Now, when the Home Agent 5 receives packets from the correspondent host 2, destined for the mobile host 1F and addressed with the home address of the mobile host, it "encapsulates" the received packets, providing a new packet header which uses the registered care-of address as the destination IP address for the encapsulated data. The encapsulated data is then forwarded, via the Internet, to the foreign agent 6. This forwarding of the encapsulated data, is called IP Tunneling. The foreign agent 6 "decapsulates" the received packets, to recover the original packets and directs them to the mobile host 1F via the foreign wireless access network 3F Another variant of mobile IP, referred to as Mobile IP with co-located care-of address, has also been developed. This variant does not use foreign agents. In this variant the care-of address is a local address assigned to the mobile host using, for example, DHCP (Dynamic Host Configuration Protocol) or stateless autoconfiguration in IPv6 (Internet Protocol Version 6). Mobile hosts send their registration messages directly (i.e. not via foreign agents) to Home Agents and encapsulated packets arrive directly from the Home Agents (i.e. not via foreign agents) at the mobile hosts, which are responsible for the decapsulation.

The prior art system (basic Mobile IP) illustrated in FIG. 1 has the disadvantages that, although data or packets from the mobile host 1F, attached to the foreign wireless access 3F can pass in a sense directly to the correspondent host 2, data or packets from the correspondent host 2 to the mobile host 1F must follow an indirect or two-part path via the Home Agent 5. The Home Agent 5 may be distant from the foreign host 6, which involves delay in passing packets, and considerable network resources may by taken up in forwarding data or packets from the Home Agent 5 to the foreign agent 6. Further, provision the Home Agent 5 also represents a considerable additional overhead for the system. Similar disadvantages also apply to the "Mobile IP with co-located care-of address" variant which is briefly described above.

Figure 2:
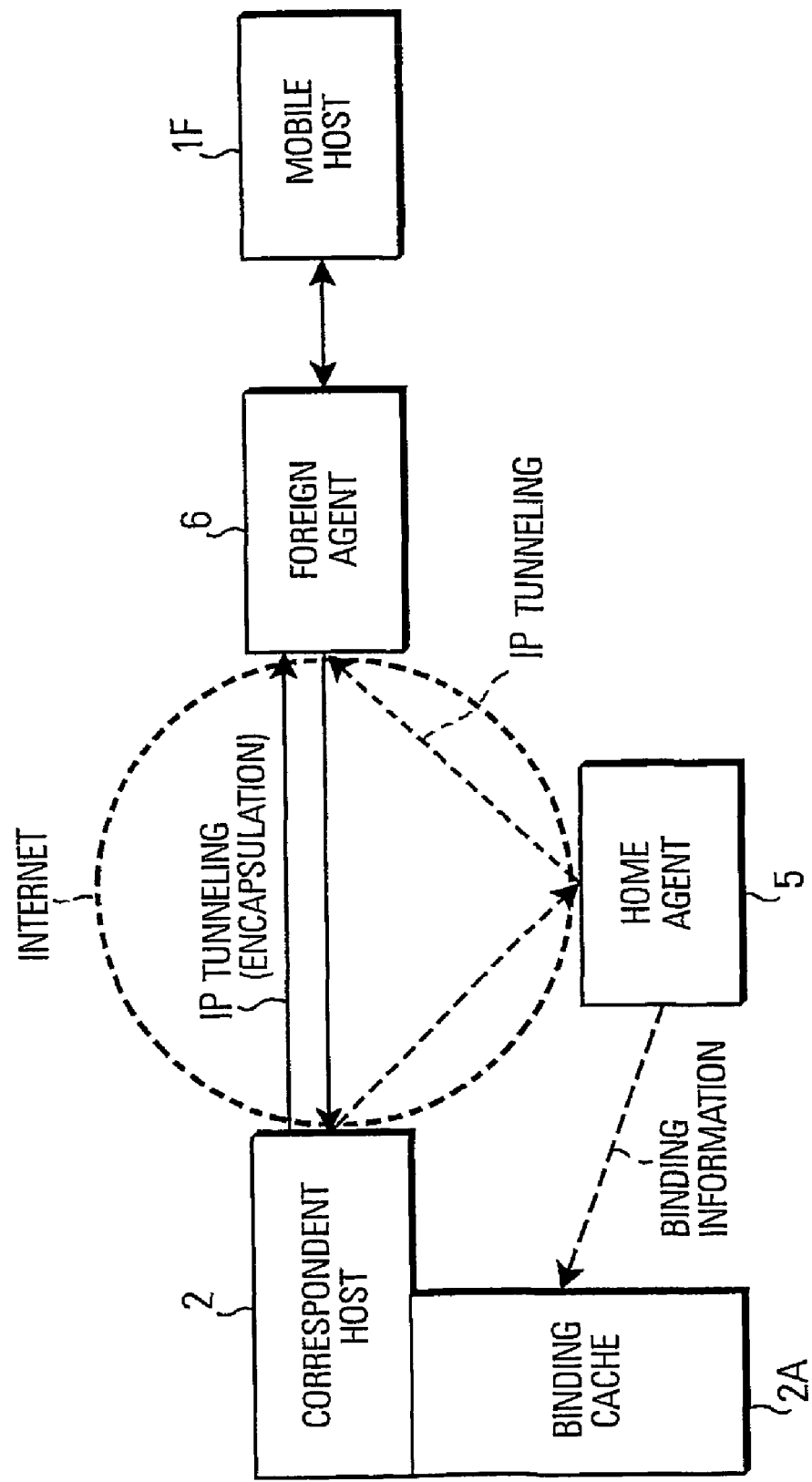
FIG. 2 schematically illustrates a prior art system similar to that of FIG. 1 but employing the Route Optimization variant of Mobile IP protocol.

FIG. 2 illustrates a development of the system of FIG. 1, in which the disadvantages of the system of FIG. 1 are partially overcome.

In this development, a binding cache 2A is associated with the correspondent host 2. Initially, passage of data or packets between mobile host 1F and correspondent host 2 occurs as in the system of FIG. 1, and again the mobile host 1F, possibly with the assistance of the foreign agent 6, sends a registration request to the Home Agent 5, which request identifies the care-of address now used by the mobile host 1F. In response, the home agent again registers the care-of address in association with the home address of the mobile host 1F. However, in the system of FIG. 2, binding information, identifying the association of the care-of address with the home address of the mobile host 1F, is then passed to and stored in the binding cache 2A.

With this binding information the correspondent host 2 is able to "encapsulate" packets intended for the mobile host 1F, providing a new packet header which uses the registered care-of address as the destination IP address for the encapsulated data. The encapsulated data is then forwarded directly (IP Tunneling), via the Internet, to the foreign agent 6 without use being made of the home agent. The foreign agent 6 again "decapsulates" the received packets, as in the system of FIG. 1, to recover the original packets and directs them to the mobile host 1F via the foreign wireless access network 3F.

The system of FIG. 2, after the initial phase, can avoid the delay and resource take-up disadvantages of the system of FIG. 1, but does not avoid the Home Agent overhead, and introduces a new overhead in the form of the binding cache 2A.

Figure 3:
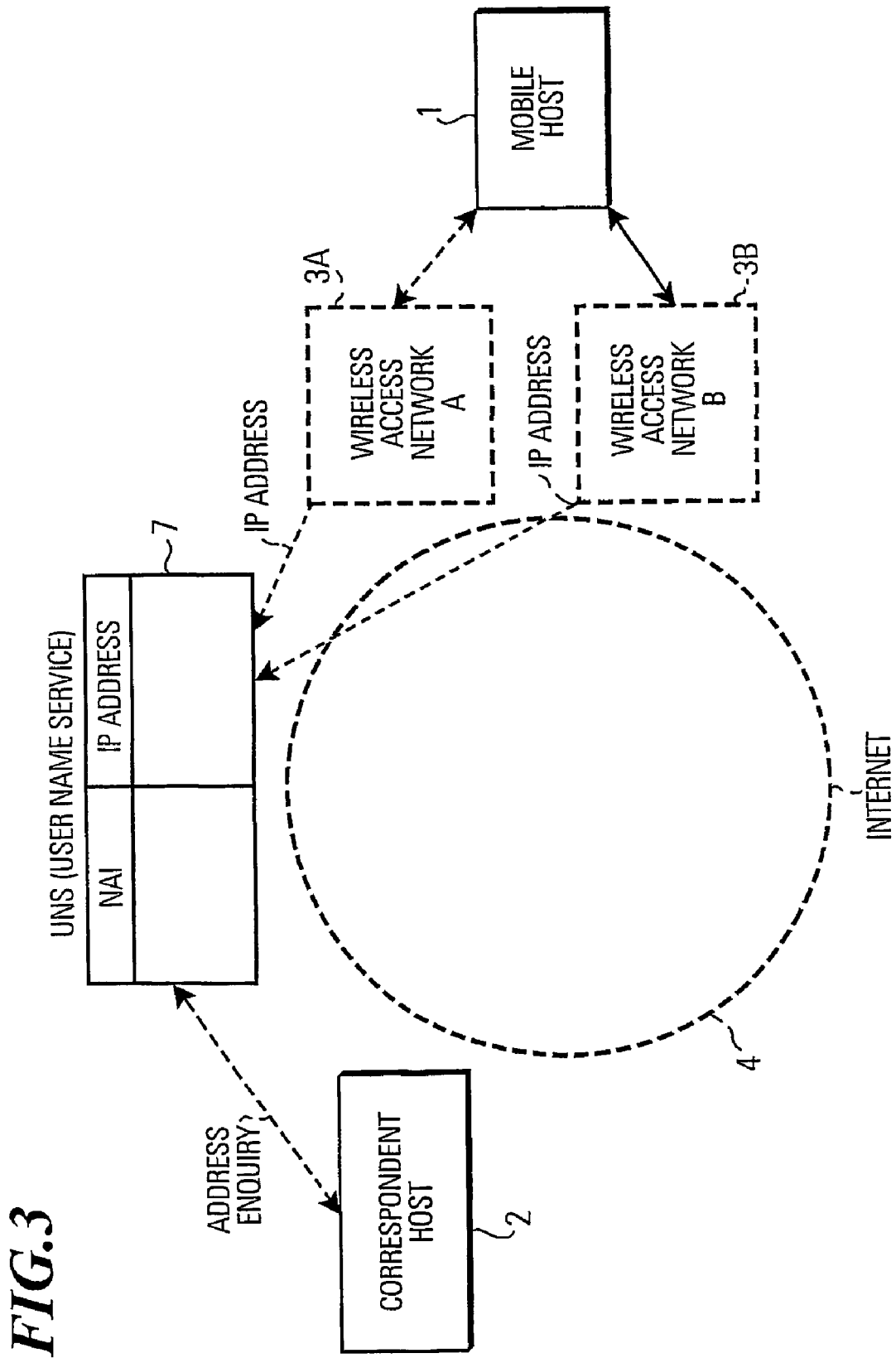
FIG. 3 schematically illustrates a prior art system which does not employ a Home Agent.

FIG. 3 illustrates a further development in which the need for a Home Agent is avoided.

In the system of FIG. 3, use is made of a so-called User Name Service (UNS) 7. In the system of FIG. 3A, a mobile host 1 is identified by a Network Access Identifier (NAI), which may have the form "USERNAME@DOMAIN", which, when the mobile host 1 wishes to communicate with the correspondent host 2, is passed to the correspondent host 2. Further, when the mobile host 1 attaches to a wireless access network 3A or 3B and is offered an IP address by that access network, the access network forwards the association of the Network Address Identifier (NAI) of the mobile host, together with the IP address offered to the mobile host, to the User Name Service (UNS) 7, which is a database of such associations of NAI's and IP addresses. The correspondent host 2, having received the NAI passed to it from the mobile host 1, can then look up the association of that NAI with IP address in the UNS 7 database and then send packets to the IP address associated with the NAI of the mobile host 1. In this way, the need for a Home Agent is avoided, even at the initial stage of a communication session between mobile host 1 and correspondent host 2.

However, although the "Home Agent" prior art systems of FIGS. 1 and 2 can allow a mobile host to maintain an active data session during migration from one access network to another, even though the mobile host needs to change its IP address, this is not the case in system of FIG. 3.

In the systems of FIGS. 1 and 2, when the mobile host moves to a new network and is assigned a new IP address, the Home Agent is informed of the new address, for example by a foreign agent of the new network. In the system of FIG. 1, the Home Agent then tunnels packets to the new address, whilst in the system of FIG. 2 the binding information in the binding cache is updated by the Home Agent, so that the correspondent host 2 can then send packets to the new address. It is possible that some packets from the correspondent host 2 which are "in flight" (to the old IP address of the mobile host) when the new IP address is assigned to the mobile host may be lost, but the active data session can be maintained. It is possible that, in the systems of FIGS. 1 and 2, agents (e.g. foreign agents) may cooperate to forward "in flight" packets from the old IP address to the new IP address of the mobile host.

In the system of FIG. 3, however, the mobile host relying upon its Network Access Identifier (NAI) must end all its active data sessions before migrating to a new access network, and the restart data sessions after migration, registering its new NAI-IP address association in the UNS 7 database.

Figure 4:
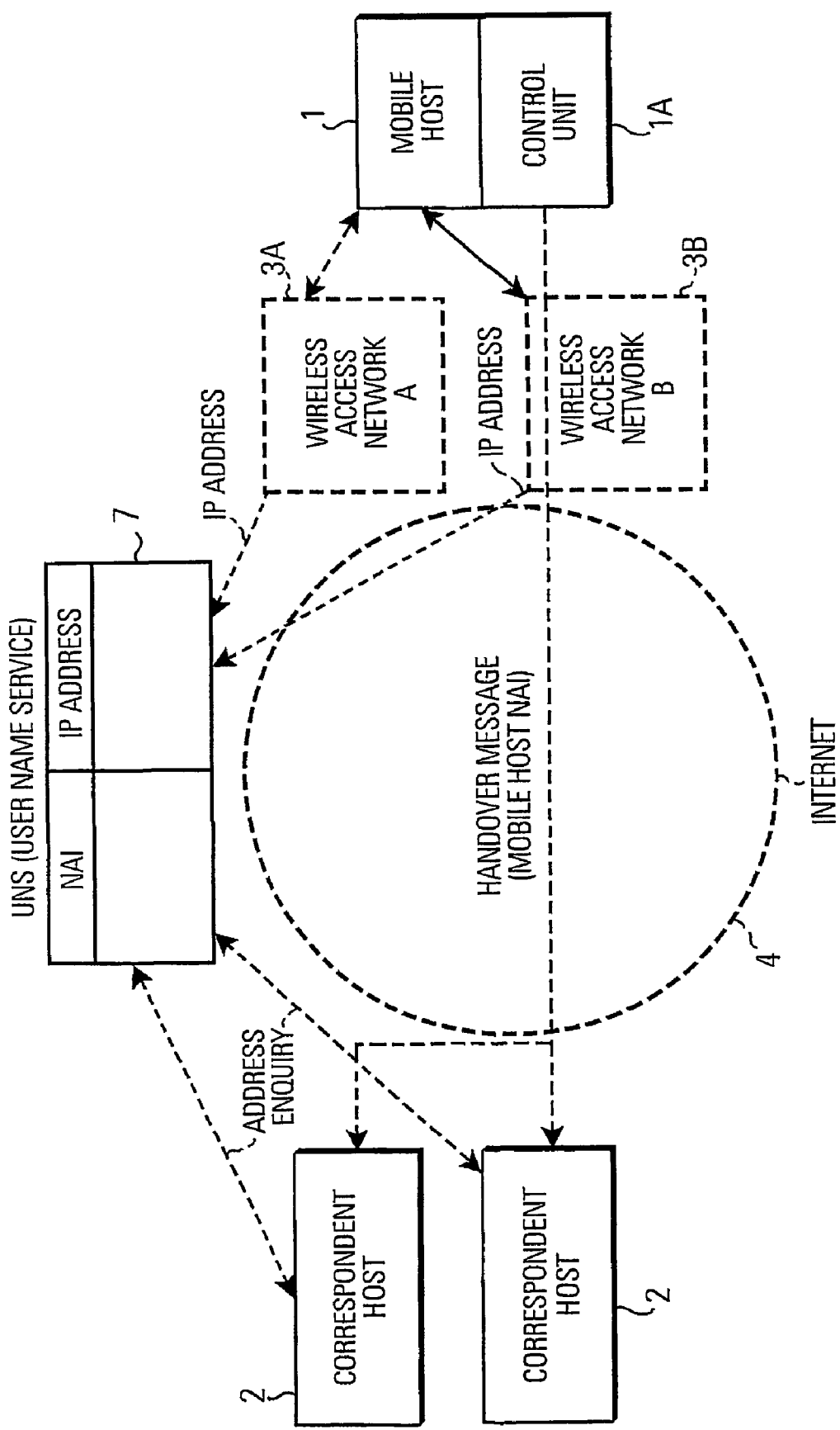
FIG. 4 schematically illustrates a system in accordance with a first embodiment of the present invention.

FIG. 4 illustrates a system in accordance with a first embodiment of the present invention. In this system, the mobile host 1 is provided with a control unit 1A. The control unit 1A is a part of the mobile host 1. It can be implemented either in hardware or in software. In this system use is also made of a User Name Service (UNS) 7. The User Name Service (UNS) 7 employed in an embodiment of the present invention may, as in the system of FIG. 3, make use of Network Access Identifiers (NAIs) for identifying mobile hosts. However, in embodiments of the invention, other types of identifier may be used. The use of NAIs in embodiments of the invention is merely one example of a type of identifier which may be employed.

The control unit 1A of the mobile host operates as follows:

1. The control unit 1A maintains a list of correspondent hosts 2 with which the mobile host 1 is engaged in active communication session.
2. The control unit 1A monitors the mobile host's 1 network connection and notices when the mobile host 1 has changed its IP address, for example upon migration from wireless access network 3A to wireless access network 3B, as illustrated in FIG. 4.
3. Upon a change of IP address, the control unit 1A sends a message to each of the correspondent hosts 2 with which the mobile host is actually engaged in a data session. In FIG. 4 this message is indicated by "HANDOVER MESSAGE" (The message can conveniently reuse the Internet Control Message Protocol (ICMP) format, but it can also take another format.) The message contains the mobile hosts identifier (e.g. NAI) which is used in the User Name Service (UNS) 7.

The correspondent hosts 2 can now use this identifier to contact the User Name Service (UNS) 7 and obtain the new IP address of the mobile host.

Thus, in accordance with this embodiment of the invention, an inter-network handover is performed as follows. The mobile host 1 moves to the new access network (e.g. to 3B from 3A) and obtains a new IP address. The new IP address is communicated to the User Name Service, as indicated in FIG. 4. The control unit 1A sends messages to each host 2 with which the mobile host 1 has an active communication session. These correspondent hosts 2 learn the mobile host's new IP address from the UNS 7, using the information found in the messages from the control unit 1A. Subsequent data packets from these correspondent hosts 2 to the mobile host 1 are directly sent to the mobile host's new IP address.

Figure 5:
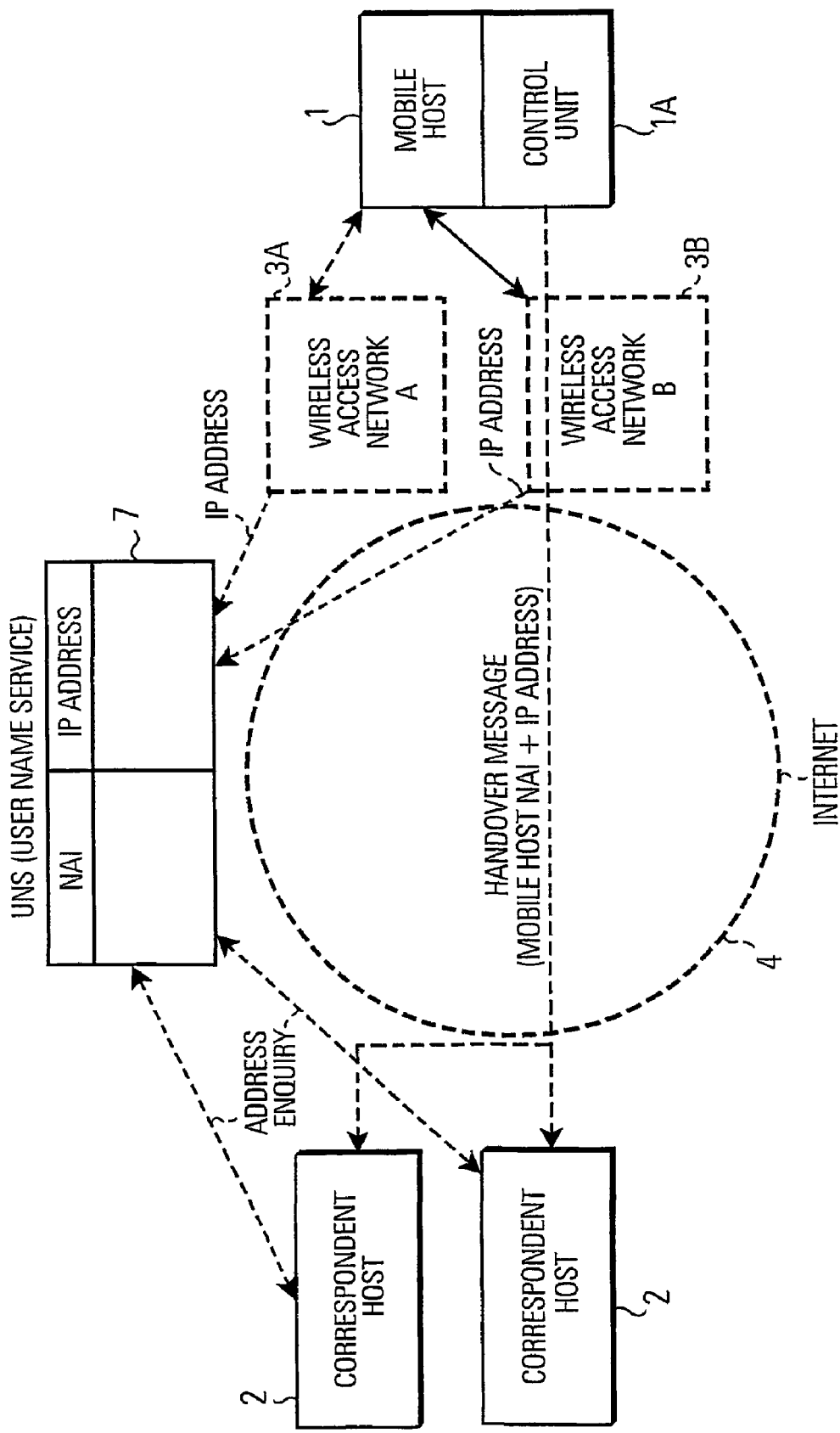
FIG. 5 schematically illustrates a system in accordance with a second embodiment of the present invention.

In accordance with the embodiment of the present invention illustrated in FIG. 5 the messages ("HANDOVER MESSAGE") from the control unit 1A to the correspondent hosts 2 also contain the new IP address itself of the mobile host 1. In this embodiment however, this IP address information will need to be authenticated and possibly encrypted in order to prevent malicious hosts from manipulating mobility information. Correspondent hosts 2 that have no security association with the mobile host 1 cannot decode the authentication (and/or decrypt the information) and must rely on contacting the UNS 7.

From the above it will be appreciated that in an embodiments of the present invention a mobile host has no location independent (home) IP address. The mobile host is assigned a temporary IP address that has a location significance. However, a location independent identification of the mobile host is provided by and identifier such as an NAI. This removes the need for permanently assigned Home Agents for the routing of data packets to roaming mobile hosts.

In embodiments of the invention, Internet nodes (i.e. correspondent nodes) can obtain the IP address currently associated with a mobile host, based on the mobile host identifier (e.g. NAI). This is important because, as indicated above, the mobile host has no permanent home IP address.

In an embodiment of the present invention a User Name Service (UNS) is employed to resolve mobile host identifiers (e.g. NAI strings) to IP addresses. It will be understood that the mobile host identifier may be a user identifier, i.e. an identifier ultimately associated with the current user of the mobile host rather that the mobile host per se. The UNS may be similar to the Domain Name System in that it translates string identifiers to IP addresses. When a user/mobile host "roams" into the service area of a new access network and receives a new IP address, it sends a notification message with its new IP address to its home UNS server. Authentication of such messages is easy as the user/mobile host is in a natural security association with its home UNS server. In is observed that these notification messages should not be confused with Mobile IP registration messages because they do not change routing of existing sessions and are therefore not time sensitive.

In an embodiment of the present invention a simple protocol can be defined to allow Internet nodes to query IP addresses from UNS servers, similarly to the DNS protocol. Although this mechanism relies on the correspondent node being UNS-aware, this does not contradict backward compatibility. The reason for this is that current Internet applications typically do not need to initiate communication towards user terminals (e.g. mobile hosts).

It is further observed that besides storing information mapping IP addresses to user/mobile host identifiers (e.g. NAIs), the UNS can be used to store other useful location dependent information such as terminal type, access speed, proxy servers and so on.

What is claimed is:

1. A method for maintaining an active communications session between a mobile host and a correspondent host, said mobile host served by a particular one of a plurality of access networks and capable of moving into a geographical area being served by a different access network and being served by said different access network, said method comprising the steps of:
    assigning an identifier to said mobile host wherein said identifier is independent of said access network currently serving said mobile host;
    assigning a network address to said mobile host for establishing a communication session with said correspondent host wherein said network address is dependent on said access network currently serving said mobile host and changeable when said mobile host is later served by a different access network;
    registering data with a network database wherein said data correlates said assigned identifier with said assigned network address for said mobile host;
    informing said correspondent host of said identifier when an active communication session is first established between said mobile host and said correspondent host wherein said network address assigned to said mobile host is accessible by said correspondent host when said identifier is provided by said correspondent host to said network database;
    storing a second network address identifying said correspondent host within said mobile host, said correspondent host currently maintaining a communication session with said mobile host;
    detecting said network address assigned to the mobile host being changed in response to said mobile host being served by a different access network; and
    sending a message to said correspondent host indicating the change of said network address wherein said message is identified with said identifier.

2. The method of claim 1 further comprising the step of said mobile host updating said network database with said changed network address.

3. The method of claim 2 further comprising the step of said correspondent host communicating with said network database to obtain the changed network address in response to receiving said message.

4. The method of claim 1 wherein said message further includes the changed network address.

5. The method of claim 1 wherein said correspondent host uses said changed network address to further maintain said communication session with said mobile host in response to receiving said message.

6. A mobile host for maintaining an active communications session with a correspondent host over an packet based telecommunications network wherein said packet based telecommunications network includes a network database, and said mobile host is served by a particular one of a plurality of access networks and canable of moving into a geographical area being served by a different access network and being served by said different access network, said mobile host comprising:
    an identifier associated with said mobile host wherein said identifier is independent of said access network currently serving said mobile host;
    a network address associated with said mobile host for establishing a communication session with said correspondent host wherein said network address is dependent on said access network currently serving said mobile host and changeable when said mobile host is later served by a different access network;
    wherein said mobile host registers data with said network database wherein said data correlates said assigned identifier with said assigned network address for said mobile host;
    means for informing said correspondent host of said identifier when an active communication session is first established between said mobile host and said correspondent host wherein said network address assigned to said mobile host is accessible by said correspondent host when said identifier is provided by said correspondent host to said network database; and
    a control unit for storing a second network address identifying said correspondent host, said correspondent host currently maintaining a communication session with said mobile host wherein said control unit detecting said network address assigned to the mobile host being changed in response to said mobile host being served by a different access network and sending a message to said correspondent host indicating the change of said network address wherein said message is identified with said identifier.

7. The mobile host of claim 6 further updating said network database with said changed network address.

8. The mobile host of claim 6 wherein said message further includes the changed network address.

9. A packet based telecommunication network for establishing a communication session between a mobile host capable of being served by a plurality of access networks and a correspondent host, comprising:
    means for assigning a first identifier to said mobile host wherein said first identifier is independent of said access networks;

means for assigning a second identifier to said mobile host when said mobile host is being served by a particular one of said access networks wherein said second identifier is dependent on said access network currently serving said mobile host;

a network database associated with said packet based telecommunication network for storing a record correlating said first identifier with said second identifier, wherein said network database provides said second identifier in response to a request being received with said first identifier;

transmitting means for communicating a message transmitted by said mobile host informing said correspondent host of said first identifier when an active communication session is first established between said mobile host and said correspondent host;

means for informing said correspondent host of said second identifier by said network database in response to said network database receiving a request from said correspondent host wherein said request includes said first identifier, wherein the mobile host further comprises a control unit for storing a network address associated with said correspondent host, said correspondent host currently maintaining a communication session with said mobile host and said control unit further detecting said second identifier being changed to a changed identifier in response to said mobile host being served by a different access network and sending a message to said correspondent host indicating the change of said second identifier wherein said message includes said first identifier.

10. The packet based telecommunication network of claim 9 further comprising means for updating the network database with a changed identifier and correlating said changed identifier with the first identifier.

11. The packet based telecommunication network of claim 9 further comprising means for communicating the changed identifier to said correspondent host in response to receiving a second request from said correspondent host.

12. The packet based telecommunication network of claim 9 wherein said message further includes said changed identifier.

13. The packet based telecommunication network of claim 9 wherein said correspondent host uses said changed identifier to further maintain said communication session with said mobile host in response to receiving said message.

* * * * *